United States Patent
Schlachter (10) Patent No.: US 8,256,282 B2
(45) Date of Patent: Sep. 4, 2012

(54) IN SITU DETERMINATION OF CRITICAL DESORPTION PRESSURES

(75) Inventor: Greg Schlachter, Bogota, CO (US)

(73) Assignee: Schlumberger Technology Corporation, Sugar Land, TX (US)

( * ) Notice: Subject to any disclaimer, the term of this patent is extended or adjusted under 35 U.S.C. 154(b) by 676 days.

(21) Appl. No.: 12/173,120

(22) Filed: Jul. 15, 2008

(65) Prior Publication Data

US 2010/0012316 A1 Jan. 21, 2010
US 2011/0277993 A9 Nov. 17, 2011

Related U.S. Application Data

(60) Provisional application No. 60/950,758, filed on Jul. 19, 2007.

(51) Int. Cl.
*E21B 49/08* (2006.01)
(52) U.S. Cl. ................................. 73/152.27
(58) Field of Classification Search ............ 73/152.17, 73/152.18, 152.51, 152.54, 152.27, 152.28
See application file for complete search history.

(56) References Cited

U.S. PATENT DOCUMENTS

| | | | | |
|---|---|---|---|---|
| 4,782,695 A * | 11/1988 | Glotin et al. | ............... | 73/152.51 |
| 5,329,811 A * | 7/1994 | Schultz et al. | ............ | 73/152.02 |
| 5,462,116 A * | 10/1995 | Carroll | ............ | 166/249 |
| 6,128,949 A * | 10/2000 | Kleinberg | ............ | 73/152.18 |
| 6,758,090 B2 * | 7/2004 | Bostrom et al. | ............ | 73/152.58 |
| 7,216,702 B2 | 5/2007 | Carlson | | |
| 7,287,585 B2 | 10/2007 | Carlson | | |
| 7,296,462 B2 * | 11/2007 | Gregory et al. | ............ | 73/152.51 |
| 7,726,404 B2 * | 6/2010 | Kubala et al. | ............ | 166/308.2 |
| 7,733,490 B2 * | 6/2010 | Goodwin et al. | ............ | 356/436 |
| 7,913,556 B2 * | 3/2011 | Hsu et al. | ............ | 73/152.28 |
| 2004/0060351 A1 * | 4/2004 | Gunter et al. | ............ | 73/152.05 |
| 2005/0067166 A1 * | 3/2005 | Trueman et al. | ............ | 166/313 |
| 2005/0194133 A1 * | 9/2005 | Carlson | ............ | 166/264 |
| 2006/0207761 A1 * | 9/2006 | Carlson | ............ | 166/250.16 |
| 2006/0243047 A1 * | 11/2006 | Terabayashi et al. | ............ | 73/152.55 |
| 2006/0248949 A1 * | 11/2006 | Gregory et al. | ............ | 73/152.51 |
| 2007/0119244 A1 * | 5/2007 | Goodwin et al. | ............ | 73/152.28 |
| 2008/0078543 A1 * | 4/2008 | Carlson | ............ | 166/250.01 |
| 2009/0260828 A1 * | 10/2009 | Kubala et al. | ............ | 166/308.3 |
| 2009/0319307 A1 * | 12/2009 | Carlson | ............ | 705/7 |

FOREIGN PATENT DOCUMENTS

CA 2002595 2/1991
(Continued)

OTHER PUBLICATIONS

Schlachter, Greg, "Using Wireline Formation Evaluation Tools to Characterize Coal Bed Methane Formations", 207 SPE East Kentucky Symposium, Lexington, KY, USA, Oct. 18-21, 2007, SPE 108134.
International Search Report of PCT Application Serial No. PCT/CA2008/001320 dated Oct. 9, 2008.

(Continued)

*Primary Examiner* — John Fitzgerald (57) ABSTRACT

The critical desorption pressure is determined by pumping out an area within a well bore. As the pressure in that area is decreased, formation fluid from the surrounding rock matrix is drawn into the area. As the local pressure is decreased further, gaseous bubbles within the formation fluid will begin to form. The formation fluid is observed, and the formation of the gaseous bubbles is detected. The critical desorption pressure is determined based upon the presence of gas within the formation fluid. The concentration of gas within the formation fluid can then be determined based on the determination of the critical desorption pressure.

18 Claims, 9 Drawing Sheets

FOREIGN PATENT DOCUMENTS

| | | |
|---|---|---|
| CA | 2557384 | 1/2005 |
| CA | 2605441 | 12/2006 |
| CA | 2600795 | 1/2009 |
| RU | 2121062 | 10/1998 |
| WO | WO 2006099399 A2 * | 9/2006 |

OTHER PUBLICATIONS

Exam Report of Canadian Application Serial No. 2,690,142 dated Oct. 21, 2011.

* cited by examiner

IN SITU DETERMINATION OF CRITICAL DESORPTION PRESSURES

BACKGROUND OF THE INVENTION

1. Field of the Invention

The present invention relates generally to systems, methods and apparatuses useful for well drilling sites, and well site analysis. More specifically, the present invention relates to systems, methods and apparatuses for well site analysis using wire line formation evaluation tools for in situ determination of critical desorption pressures in water saturated coal bearing formations.

2. Background of the Invention

Wire line formation evaluation tools have been used for over 50 years in conventional formations to acquire formation pressures, permeability, fluid samples and many other reservoir characteristics. These same wire line tools have been used successfully to characterize coal bed methane formations.

Coal bed methane reservoirs can contain a quantity of gas adsorbed onto the coal surfaces and dissolved in formation water. The quantity of the sorbed gas within the coal matrix and dissolved in the water contributes a partial pressure to the overall pressure of the reservoir. Due to known relationships between gas partial pressures, and gas solubility concentrations, determining the partial pressure of the gas within the reservoir provides an effective method to determine the overall gas content of the reservoir. Once gas content is quantified, operators are better able to make informed decisions about the economic feasibility of well site operations and drillings.

The effective partial pressure of the natural gas can be found by determining the critical desorption pressure of the adsorbed gas. Since the adsorbed gas on the coal surfaces and the dissolved gas in the formation water exist in equilibrium, the critical desorption pressure is the pressure at which the pressure inside the reservoir is equal to the partial pressure of the dissolved gas. At the critical desorption pressure, the reservoir begins to discharge the dissolved gas as bubbles in the water. The critical desorption pressure is the formation pressure at which a water saturated coal would have to be reduced to for desorbed gas production to begin. Because water pump out and disposal costs during well production can be significant, determination of the critical desorption pressure is a key factor in defining the economics of a coal bed methane formation.

Determination of the critical desorption pressure is typically performed by retrieving a core sample from the well site. Once brought to the surface, the core sample is sealed into a container to prevent the escape of any gas prior to analysis. The core sample is then allowed to liberate its gas under controlled conditions, so that the total quantity of gas can be measured. The gas produced is then related to the critical desorption pressure using known isotherms.

However, there are several sources of error using the known procedure. Coal cores begin depressurization and gas desorption as they are brought to surface before they can be contained in a canister and therefore errors are introduced before laboratory measurements can be made. Gas released from the core sample before it is contained must be estimated, introducing a source of error in the determination of the critical desorption pressure. Additionally, the core sample must be taken away from the drill site to an off-site laboratory for analysis. Waiting on off-site laboratory determination of the critical desorption pressure can often take days, thus delaying the drilling process.

SUMMARY OF THE INVENTION

In view of the above problems, an object of the present invention is to provide methods, apparatuses and systems for determining a wire line acquired in situ critical desorption pressure while eliminating or minimizing the impact of the problems and limitations described. An in situ critical desorption pressure represents a valuable measurement point in characterizing the Langmuir sorption isotherm relationship. The value of an in situ critical desorption pressure becomes apparent as a method to calibrate the Langmuir sorption isotherm.

The critical desorption pressure is determined by creating a local area of reduced pressure within an isolated interval of the well bore. As the pressure in that isolated interval is decreased, formation fluid from the surrounding formation matrix is drawn into the area. As the local pressure is decreased further, gaseous bubbles within the formation fluid will begin to form. The formation fluid is observed while pumping, and the formation of the gaseous bubbles is detected in the water phase. The critical desorption pressure is determined based upon the presence of gas bubbles within the formation water. The quantity of gas within the coal bearing formation can be determined based on the determination of the critical desorption pressure.

Other objects, features and advantages of the present invention will become apparent to those of skill in art by reference to the figures, the description that follows and the claims.

DETAILED DESCRIPTION OF THE DRAWINGS

In the following detailed description of the preferred embodiments and other embodiments of the present invention, reference is made to the accompanying drawings. It is to be understood that those of skill in the art will readily see other embodiments and changes may be made without departing from the scope of the present invention.

Figure 1:
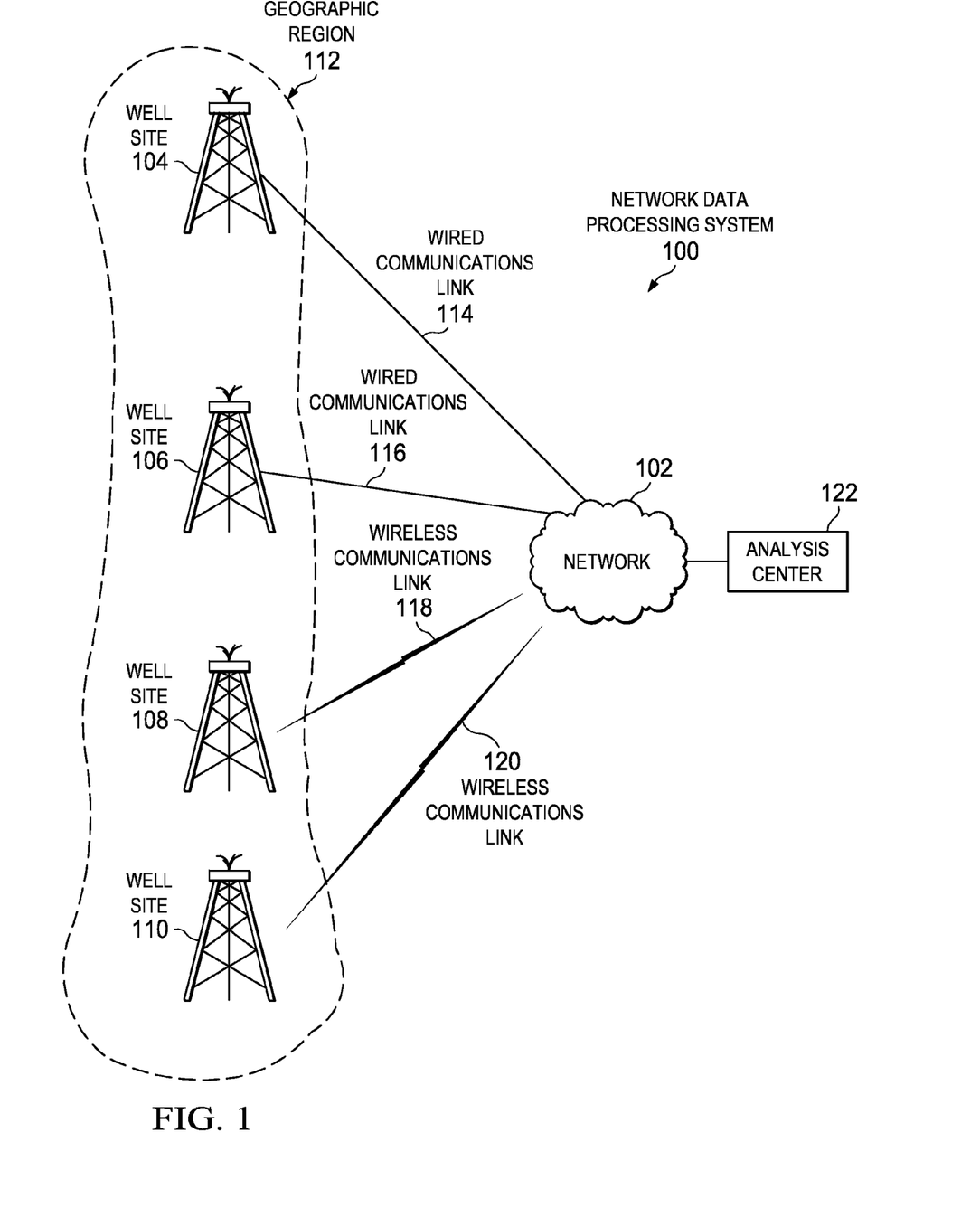
FIG. 1 is a pictorial representation of a network data processing system in which a preferred embodiment of the present invention may be implemented.

With reference now to FIG. 1, a pictorial representation of a network data processing system is depicted in which a preferred embodiment of the present invention may be implemented. In this example, network data processing system 100 is a network of computing devices in which different embodiments of the present invention may be implemented. Network data processing system 100 includes network 102, which is a medium used to provide communications links between various devices and computers in communication with each other within network data processing system 100. Network 102 may include connections, such as wire, wireless communications links, or fiber optic cables. The data could even be delivered by hand with the data being stored on a storage device, such as a hard disk drive, DVD, or flash memory.

In this depicted example, well sites 104, 106, 108, and 110 have computers or other computing devices that produce data regarding wells located at these well sites. In these examples, well sites 104, 106, 108, and 110 are located in geographic region 112. This geographic region is a single reservoir in these examples. Of course, these well sites may be distributed across diverse geographic regions and/or over multiple reservoirs, depending on the particular implementation. Well sites 104 and 106 have wired communications links 114 and 116 to network 102. Well sites 108 and 110 have wireless communications links 118 and 120 to network 102.

Analysis center 122 is a location at which data processing systems, such as servers, are located to process data collected from well sites 104, 106, 108, and 110. Of course, depending upon the particular implementation, multiple analysis centers may be present. These analysis centers may be, for example, at an office or an on-site in geographic location 112 depending upon the particular implementation. In these illustrative embodiments, analysis center 122 analyzes data from well sites 104, 106, 108, and 110 using processes for different embodiments of the present invention.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

The different embodiments recognize that being able to analyze all of the different types of data available from well sites is useful in identifying formations. In particular, using different types of data obtained from a well site allows for identifying heterogeneity in formations or regions underlying the well site.

The different embodiments of the present invention provide a computer implemented methods, apparatuses, and computer usable program codes for identifying rock heterogeneity. These embodiments also facilitate the selection of coring sampling locations based on the identified heterogeneity, and solutions for various oil field problems. In these illustrative embodiments, the heterogeneity of a formation is identified using continuous well data. This continuous well data includes, for example, well logs, measurements while drilling data, mud logs, drill cuttings, and other information that are combined to form a data set. After sampling occurs, material properties are measured and these properties are associated with the data. These material properties include, for example, reservoir, geochemical, petrologic, and mechanical properties. Next, models for propagating each of the measured properties along the length of the well bore are obtained.

Also, models for predicting properties in other well sites and making decisions about the well site also may be obtained from this information. In this manner, the different illustrative embodiments allow for a construction of non-conventional three-dimensional models that are based on well data for use in managing a reservoir. This information may be used to manage the well sites and formations. For example, the information may be used for better discrimination of production sweet spots and for better guidance for drilling and production planning.

Figure 2:
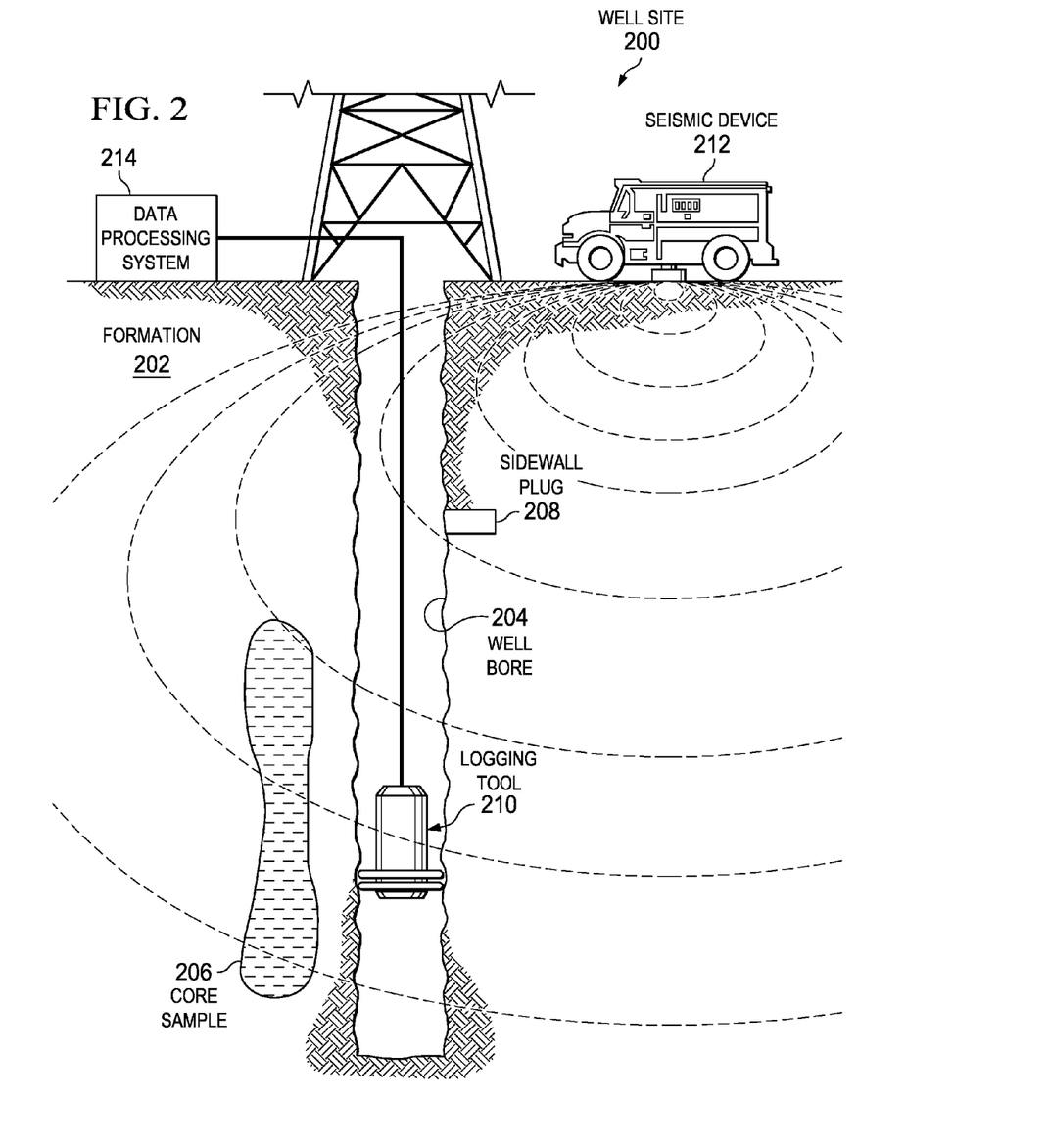
FIG. 2 is a diagram illustrating a well site from which data is obtained in accordance with a preferred embodiment of the present invention.

Turning now to FIG. 2, a diagram illustrating a well site from which data is obtained is depicted in accordance with a preferred embodiment of the present invention. Well site 200 is an example of a well site, such as well site 104 in FIG. 1. The data obtained from well site 200 is referred to as data in these examples.

In this example, well site 200 is located on formation 202. During the creation of well bore 204 in formation 202, different samples are obtained. For example, core sample 206 may be obtained as well as sidewall plug 208. Further, logging tool 210 may be used to obtain other information, such as pressure measurements and factor information. Further, from creating well bore 204, drill cuttings and mud logs are obtained.

Other information, such as seismic information also may be obtained using seismic device 212. This information may be collected by data processing system 214 and transmitted to an analysis center, such as analysis center 122 in FIG. 1. For example, seismic measurements made by seismic device 212 may be collected by data processing system 214 and sent for further analysis.

The information collected at well site 200 may be divided into groups of continuous data and groups of discrete data. The continuous data may be well site data or laboratory data and the discrete data also may be well site data or laboratory data in these examples. Well site data is data obtained through measurements made on the well while laboratory data is made from measurements obtained from samples from well site 200. For example, continuous well site data includes, for example, seismic, log/log suite and measurements while drilling. Continuous laboratory data includes, for example, strength profiles and core gamma information. Discrete well site data includes, for example, sidewall plugs, drill cuttings, pressure measurements, and gas flow detection measurements. The discrete laboratory data may include, for example, laboratory measurements made on plugs or cores obtained from well site 200. Of course, the different illustrative embodiments may be applied to any continuous well site data, continuous laboratory data, discrete well site data, and discrete laboratory data in addition to or in place of those illustrated in these examples.

The images of core samples and other data measured or collected by devices at well site 200 may be sent to data processing system 214 for transmission to the analysis center. More specifically, the data may be input or received by data processing system 214 for transmission to an analysis center for processing. Alternatively, depending upon the particular implementation, some or all processing of the data from well site 200 may be performed using data processing system 214. For example, data processing system 214 may be used to preprocess the data or perform all of the analysis on the data from well site 200. If all of the analysis is performed using data processing system 214, the results may then be transmitted to the analysis center to be combined from results from other well sites to provide additional results.

Figure 3:
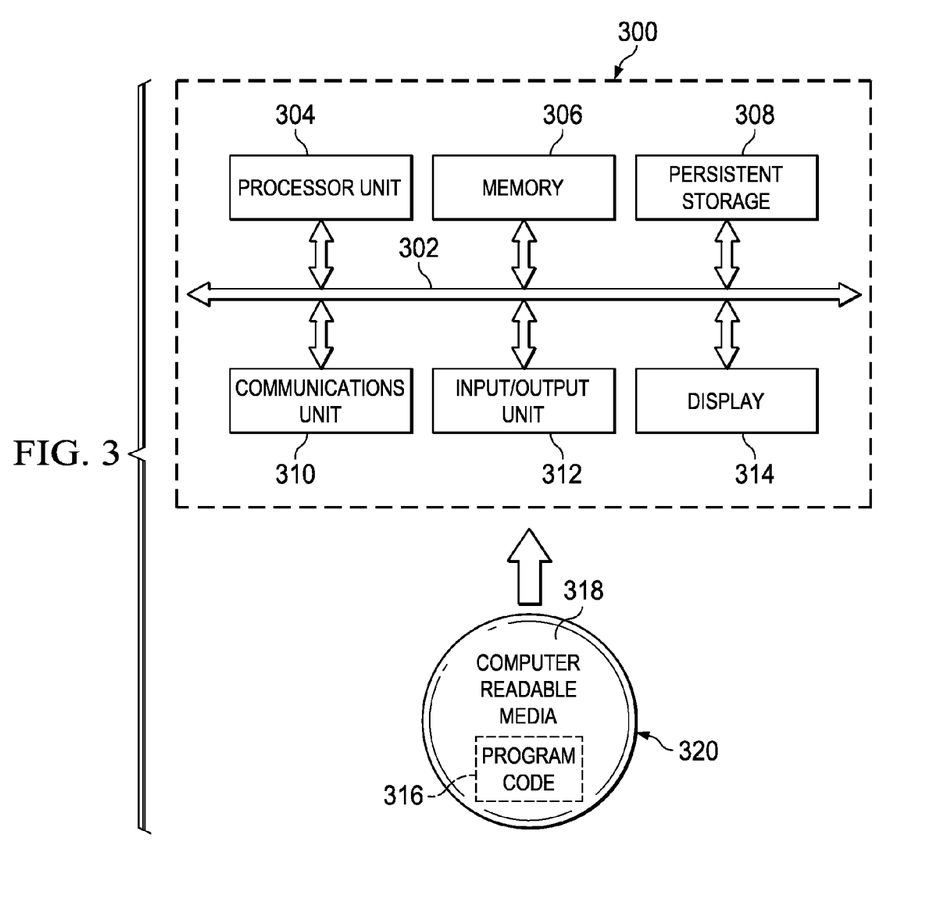
FIG. 3 is a diagram of a data processing system depicted in accordance with an advantageous embodiment of the present invention.

Turning now to FIG. 3, a diagram of a data processing system is depicted in accordance with an illustrative embodiment of the present invention. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multiprocessor system containing multiple processors of the same type.

Memory 306, in these examples, may be, for example, a random access memory. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as computer usable program code or computer readable program code that may be read and executed by a processor in processor unit 304.

The computer readable program code may be embodied on different physical or tangible computer readable media, such as memory 306 or persistent storage 308.

Computer usable program code 316 is located in a functional form on computer readable media 318 and may be loaded onto or transferred to data processing system 300. Computer usable program code 316 and computer readable media 318 form computer program product 320 in these examples. In one example, computer readable media 318 may be, for example, an optical or magnetic disc that is inserted or placed into a drive or other device that is part of persistent storage 308 for transfer onto a storage device, such as a hard drive that is part of persistent storage 308. Computer readable media 318 also may take the form of a persistent storage, such as a hard drive or a flash memory that is connected to data processing system 300.

Alternatively, computer usable program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the computer readable program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

For example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Data obtained from the above methods are used to determine the existence of coal bed formations for drilling purposes. The different embodiments allow for analyzing data from different sources, such as data obtained from well site 200 in FIG. 2 to identify different layers in a formation. In other words, the different embodiments allow for identifying the heterogeneity of a formation. In the illustrative examples, this identification is made using continuous well data, such as the continuous well data that is obtained from well site 200 in FIG. 2. More specifically, the different embodiments use cluster analysis to identify patterns in data about a region in the ground to identify rock heterogeneity.

In other words, this information from the well site allows for an identification of different regions or groupings within a formation. In these examples, the identification of different regions may be in other zones or structures other than a formation in the ground. In these illustrative examples, a zone is some selected cross-section in the ground or some three-dimensional zone in the ground. A zone may include an entire formation, portion of formation, or other structures. In other words, a zone may cover any part of the earth under the ground. The identification of zones with similar and dissimilar material properties may be identified through this type of analysis.

Figure 4A:
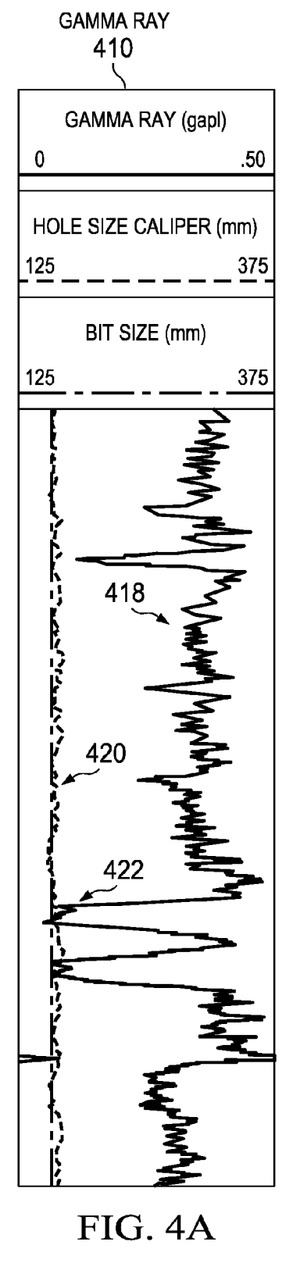
FIG. 4 is an open well logging response showing known coal intervals, according to an illustrative embodiment of the present invention.
Figure 4B:
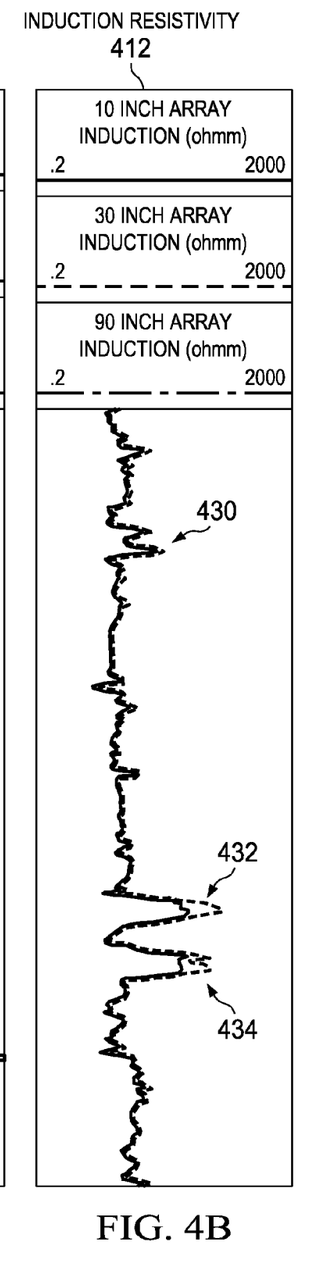
Figure 4C:
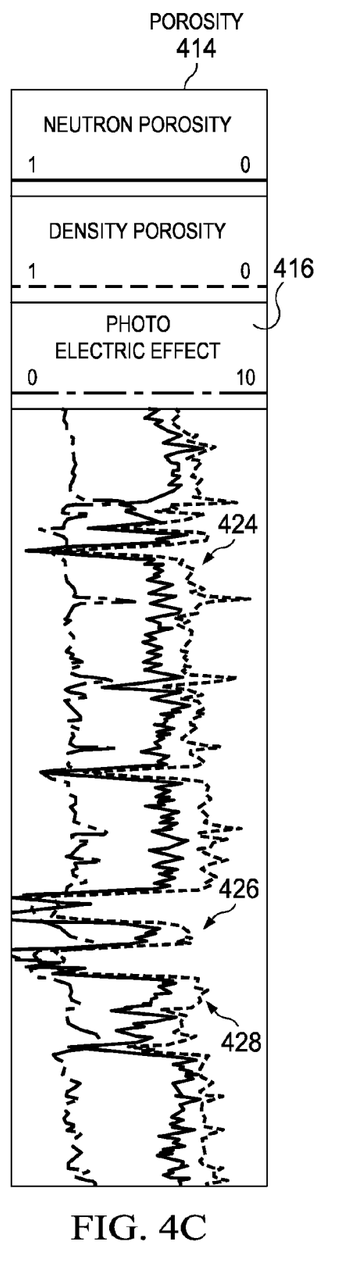

Referring now to FIG. 4, an open well logging response showing known coal intervals is shown in according to an illustrative embodiment of the invention. Data in FIG. 4 is typically obtained using nuclear and other well site evaluation techniques, such as those shown in FIG. 3.

Coals are resistive, solid hydrocarbons of low relative density and will reflect these characteristics in traditional open hole logging tool responses. FIG. 4 shows a typical open hole tool response of several well logging data collections. Gamma ray 410, induction resistivity 412, porosity 414, and photo electric effect 416 are all indicated. Coal intervals are readily identified by low gamma ray responses, such as peaks 418, 420, and 422, high porosity responses, such as peaks 424, 426, and 428, and high resistivity tool responses, such as peaks 430, 432, and 434, when compared to neighboring rock.

Figure 5:
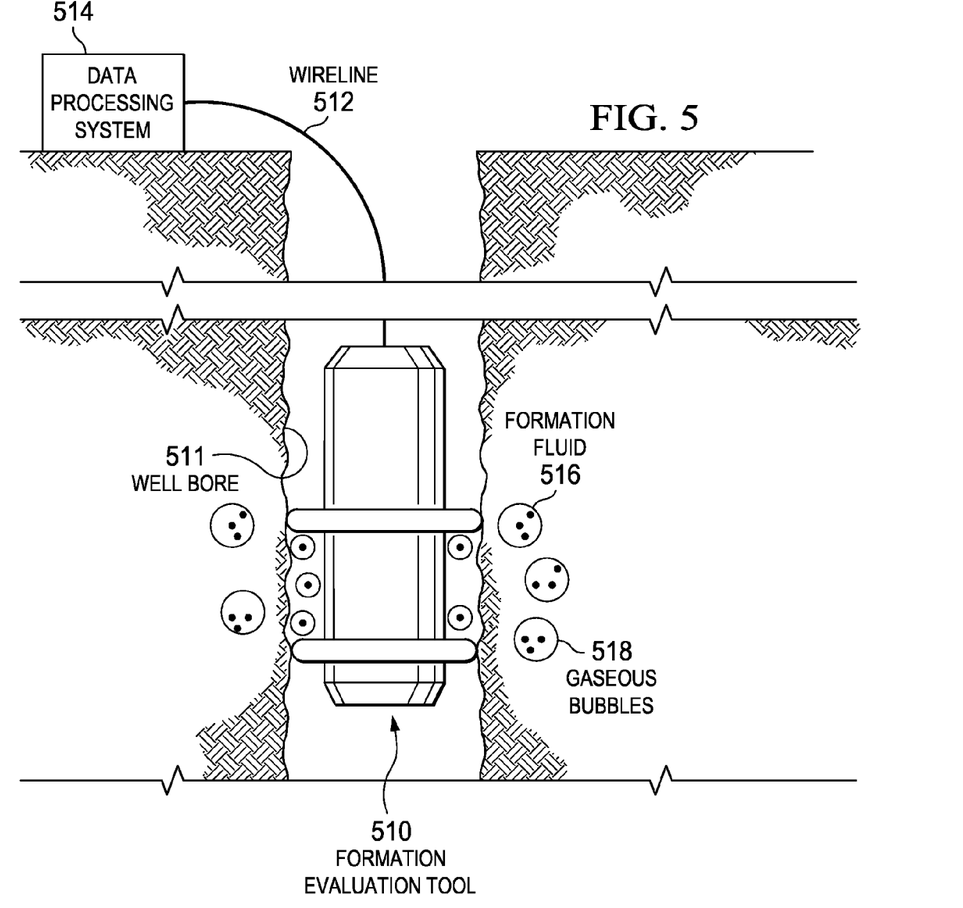
FIG. 5 is a diagram showing the data flow between a formation evaluation tool and a control computer, according to an illustrative embodiment of the present invention.

Referring now to FIG. 5, a diagram showing the data flow between a formation evaluation tool and a control computer is shown in accordance with an illustrative embodiment. Formation evaluation tool 510 is a wire line conveyed evaluation tool, capable of isolating each coal interval during pump out and build up sequences. Formation evaluation tool 510 is further capable of observing the fluid types during pump out, capturing a fluid sample, and recording and observing pressure transient data in real time.

Formation evaluation tool 510 is lowered into a well bore 511. Wire line 512 suspends formation evaluation tool 510 within the well bore 511, and provides a communications link between formation evaluation tool 510 and data processing system 514. Wire line 512 provides suspension support as formation evaluation tool 510 is lowered down well bore 511 to the requisite depth of a formation, as determined by nuclear tools or other analysis techniques.

Once formation evaluation tool 510 has reached the requisite depth, formation evaluation tool 510 begins a testing sequence to determine the critical desorption pressure of the formation. The pressure within the well bore 511 and proximate to formation evaluation tool 510 is decreased, as described in FIG. 6, drawing formation fluid 516 from within formation around well bore 511 to formation evaluation tool 510. Formation fluid 516 is then analyzed at the current local pressure. The local pressure is continuously decreased, and formation fluid 516 continuously monitored, until the occurrence of gaseous bubbles 518 within formation fluid 516 is detected. Data collected from the testing sequence is communicated to data processing system 514, where it is fit into a Langmuir sorption isotherm to help determine the gas content of the formation.

Figure 6:
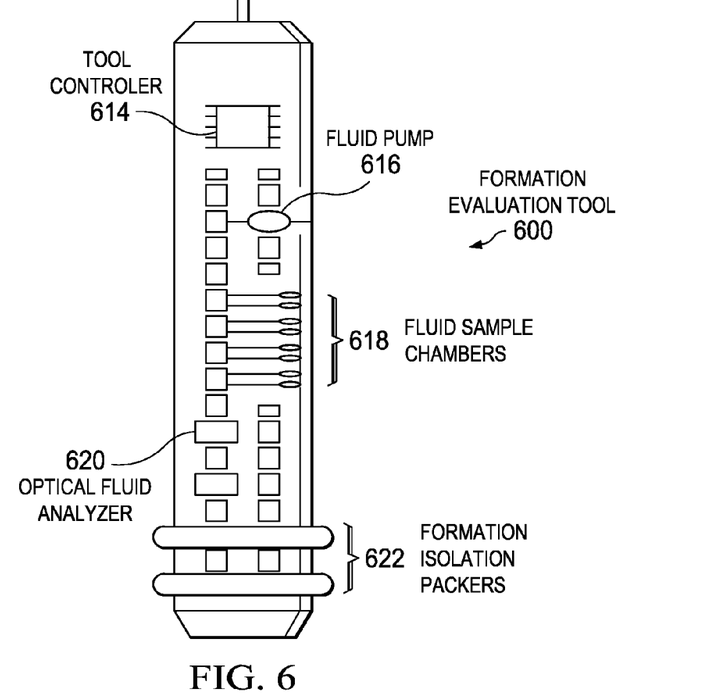
FIG. 6 is a wireline conveyed formation evaluation tool, according to an illustrative embodiment of the present invention.

Referring now to FIG. 6, an exemplary wire line conveyed formation evaluation tool 600 is shown according to an illustrative embodiment of the invention. Formation evaluation tool 600 can be formation evaluation tool 510 of FIG. 5.

Wire line 610 is a typical wire line used by operators of oil and gas wells to lower equipment into a well bore, such as well bore 204 of FIG. 2, for the purposes of a well intervention. Wire line 610 can consist of a single strand, multiple strands, or braided strands of metal wire. Wire line 610 should be capable of conducting an electrical circuit to the formation evaluation tool 600 in order to provide power to equipment located at the end of the cable formation evaluation tool 600. Wire line 610 also is capable of providing a communications pathway between formation evaluation tool 600 and any monitoring computers receiving to receive the well bore data.

Tool controller 614 provides instructions received from the control computer to other components of formation evaluation tool 600. Tool controller 614 can be a data processing system, including software instructions, which provides control instructions to formation evaluation tool 600.

Fluid pump 616 pumps formation fluid from the bore hole into fluid sample chambers 618 and isolation packers 622. Fluid pump 616 may also include valves or ports that may be opened and closed from the surface of formation evaluation tool 600. When closed, the valves or ports can prevent the introduction of formation fluids and drilling fluids into fluid sample chambers 618 and isolation packers 622 when data is not being collected.

When isolation packers 622 are initially inflated, the area between the isolation packers 622 contains drilling fluids. Fluid pump 616 removes the drilling fluids from this area, pumping the drilling fluids into the well bore outside of the area between the packers. As drilling fluid is removed, the area between the isolation packers 622 experiences a pressure drop relative to the pressure of formation fluids within the formation. Once the pressure between the packers is reduced to a pressure less than the formation pressure, formation fluid will begin to flow from the formation into the area of decreased pressure between the isolation packers. As the pressure between the formation packers is further decreased past the vapor pressure of any dissolved gasses within the formation fluid, gaseous bubbles will appear in the formation fluid.

The bubble point of the formation fluid—the pressure at which bubbles are initially observed to form in the formation fluid—is equal to the critical desorption pressure of the coal formation. While knowing the bubble point of the formation fluid is not important, knowing the critical desorption pressure is necessary for estimations of the economic viability of producing or collecting gas from the formation.

Fluid sample chambers 618 provide storage and pathways for formation fluid from fluid pump 616 to optical fluid analyzer 620. Fluid sample chambers 618 are also capable of capturing a formation fluid sample and bring it to surface at the formation pressure.

Optical fluid analyzer 620 provides data collection for the surrounding drilling fluids, and the composition thereof. A typical optical fluid analyzer is shown in FIG. 6.

Formation isolation packers 622 are inflatable annular rings disposed around the outer surface of formation evaluation tool 600. Formation isolation packers 622 are adapted for sealingly engaging the well bore. Formation isolation packers 622 are typically made of a thermoplastic elastomer, such as rubber. Fluid sample chambers 618 provide a channel by which formation fluids can be pumped from fluid pump 616 into the interior of formation isolation packers 622, causing formation isolation packers 622 to inflate and engage the sides of the well bore. Formation isolation packers 622 thus provide a seal such that the conditions in an area between formation isolation packers 622 can be changed, for instance by altering the pressure within this area, relative to the conditions elsewhere in the well bore. As the pressure between formation isolation packers 622 is decreased, formation fluids are drawn out of the formation, and into the area of reduced pressure.

Figure 7:
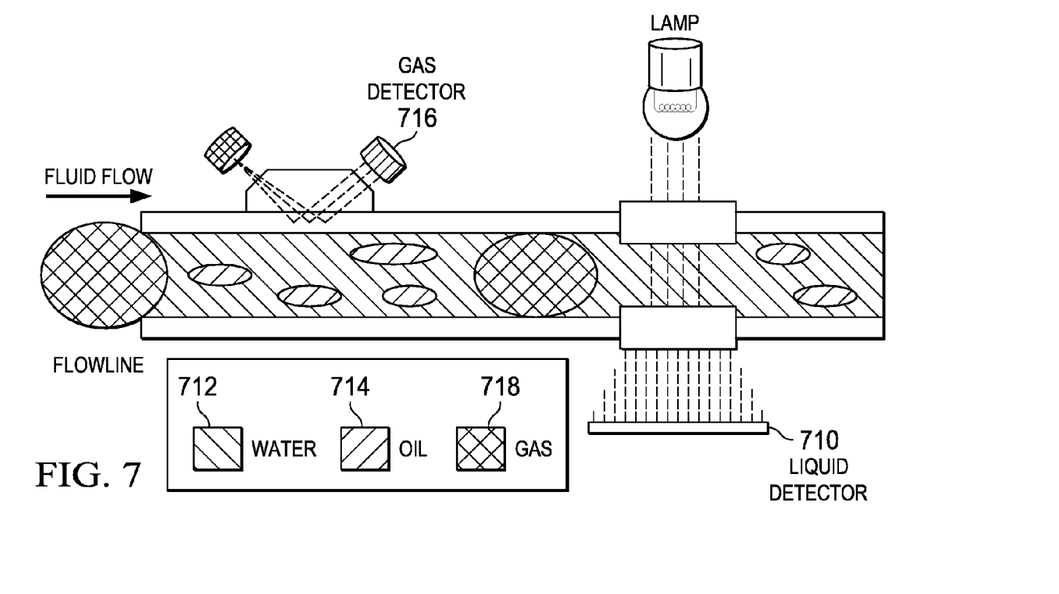
FIG. 7 is a schematic of an optical fluid analyzer showing an optical spectrometer and refractometer, according to an illustrative embodiment of the present invention.

Referring now to FIG. 7, a schematic of an optical fluid analyzer showing an optical spectrometer and refractometer, according to an illustrative embodiment of the invention.

A spectrometer, such as liquid detector 710, is able to differentiate water 712 in the formation fluid from other fluids present in the formation fluid, such as oil 714, as formation fluid is pumped through optical fluid analyzer 700. A refractometer, such as gas detector 716, is able to differentiate liquids from gas 718. Optionally, a resistivity measurement, not shown, may also be incorporated into optical fluid analyzer 700 to differentiate drilling fluid water from formation water and formation gasses.

In the case of coal bed methane, the primary concern is identifying drilling fluid, formation water and gas. Coal bed methane can contain gases other than hydrocarbons such as $CO_2$ and $N_2$. Therefore, it may be desirable to use an optical fluid analyzer that can differentiate hydrocarbon from other expected gasses.

Because gas detector 716 provides surface measurements, very small amounts of gas 718 may not cause enough light to refract into the produced fluids. In contrast, liquid detector 710 measures the response of light passing through the fluid and can give a more sensitive indication of gas present in the sample.

Before obtaining data from the area, it is important that enough reservoir fluid be throughput so that an accurate representative sample of formation fluid can be obtained. During and after drilling operations, the drilling fluid will flow into or invade the formation near the well bore. The amount of invasion will be a function of the drilling fluid density and height, drilling fluid properties such as viscosity and fluid loss control constituents, formation permeability and formation pressure. While pumping formation fluid from the formation to obtain a fluid sample, it is important to observe the fluid type. If a sufficient quantity of drilling fluid is not first pumped, inaccurate results will be obtained. These anomalous results from drilling fluid, instead of formation fluid, being analyzed.

Figure 8:
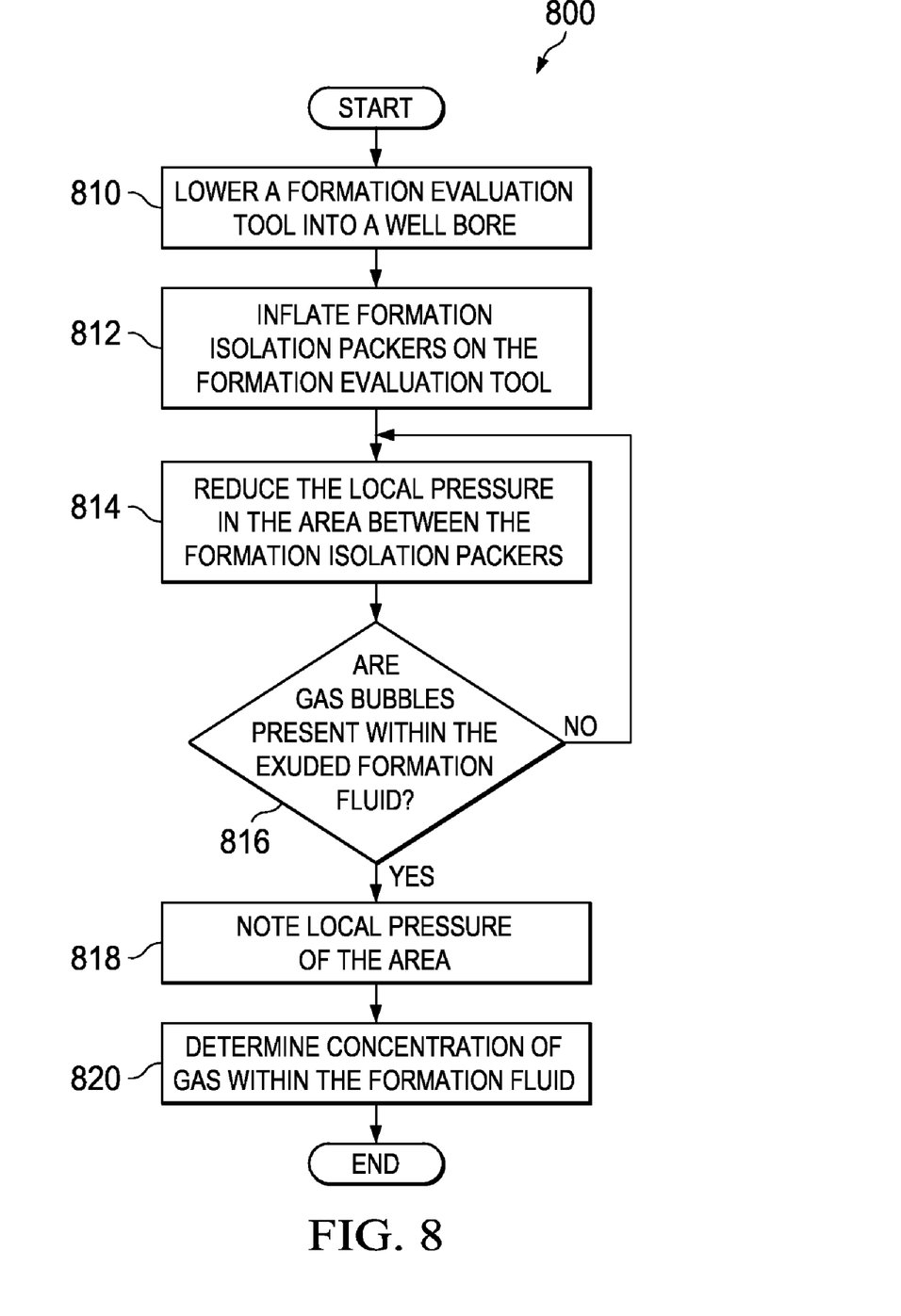
FIG. 8 is a flowchart depicting the method steps for obtaining an in situ measurement of the critical desorption pressure according to an illustrative embodiment of the invention.

Referring now to FIG. 8, a flowchart depicting the method steps for obtaining an in situ measurement of the critical desorption pressure is shown according to an illustrative embodiment of the invention.

Process 800 begins by lowering a formation evaluation tool into a well bore (Step 810). The formation evaluation tool can be any formation evaluation tool capable of performing the data collection and analysis described herein, such as formation evaluation tool 510 of FIG. 5. The formation evaluation tool is lowered to the requisite depth of the coal bearing formation, as determined by information from the well site drilling.

Formation isolation packers on the formation evaluation tool are inflated (step 812) effectively sealing a small area of the well bore from other areas of the well bore. Formation isolation packers thus provide a seal such that the conditions in an area between formation isolation packers can be changed, for instance by altering the pressure within this area, relative to the conditions elsewhere in the well bore. Formation isolation packers are inflated by pumping drilling fluids within the well bore into the interior of formation isolation packers, causing formation isolation packers to inflate and engage the sides of the well bore.

Once the formation isolation packers have been inflated, the formation evaluation tool begins reduce the local pressure in the area between the formation isolation packers (step 814). As drilling fluid is removed, the area between the formation isolation packers experiences a pressure drop relative to the fluid pressure within the formation. As more drilling fluids are removed from the area between formation isolation packers, formation fluids are pulled from the surrounding saturated well bore matrix and into the area of reduced pressure. Once the pressure between the packers is reduced to a pressure less than the formation pressure, formation fluid will begin to flow from the formation into the area of decreased pressure between the isolation packers.

As the pressure between the formation packers is further decreased past the vapor pressure of any dissolved gasses within the formation fluid, gaseous bubbles will appear in the formation fluid. As the pressure within the area between the formation isolation packers is continuously decreased, formation fluids pulled into the area are passed through a liquid analyzer to determine the presence of gas bubbles within the exuded formation fluid (step 816). The liquid detector may be a spectrometer liquid detector, such as liquid detector 710 of FIG. 7. As formation fluid is pumped through the formation evaluation tool, the liquid detector is able to differentiate water in the formation fluid from other fluids present in the formation fluid, such as oil. The liquid detector measures the response of light passing through the fluid and can give a more sensitive indication of gas present in the sample than a gas detector.

If gas bubbles are not found within the exuded formation fluid ("no" at step 816), the local pressure within the area between the formation isolation packers is reduced further, with the process 800 returning to step 814. The local area is pumped to a lower pressure, and the exuded formation fluid is again analyzed. This is repeated until the presence of gas bubbles is detected within the exuded formation fluid.

If gas bubbles are found to be present within the exuded formation fluid ("yes" at step 816), the local pressure of the area is noted (step 818). The critical desorption pressure is determined based upon the presence of gas within the formation fluid. Thus, the noted pressure when the formation of gas bubbles first occurs is equal to the critical desorption pressure.

Based on the determination of the critical desorption pressure, the concentration of gas within the formation fluid can then be determined (step 820), with the process terminating thereafter. A Langmuir equation, such as that shown and described in FIG. 8 is commonly applied to coal bed methane formations to predict gas content, once the critical desorption pressure is known.

Figure 9:
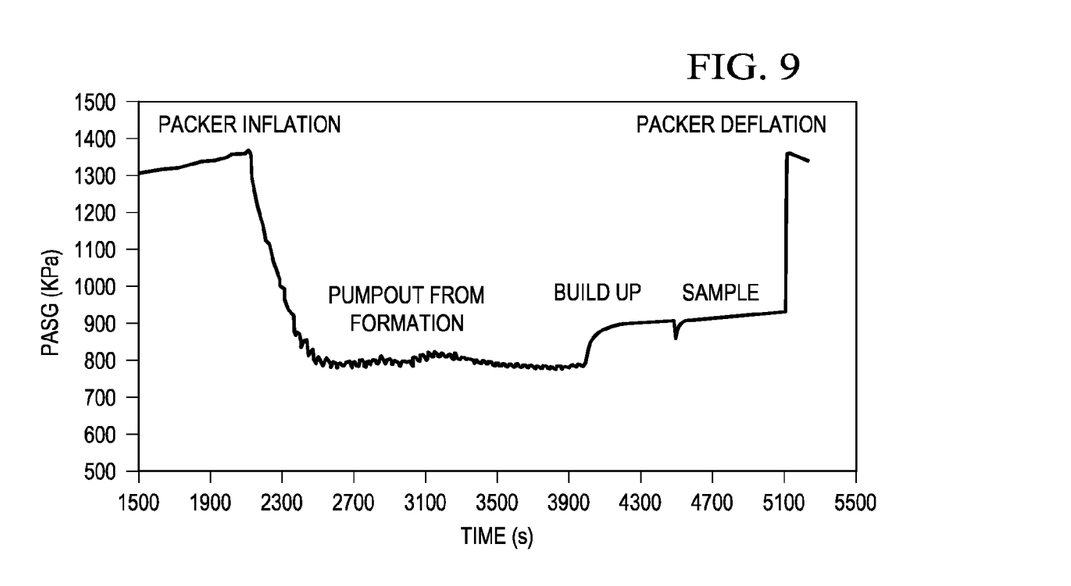
FIG. 9 is a graph of the interval pressure versus time during a testing sequence of the formation tool, according to an illustrative embodiment of the present invention.

Referring now to FIG. 9, a graph of the interval pressure versus time during a testing sequence of the formation tool is shown according to an illustrative embodiment of the invention. The graph of FIG. 9 can be obtained by using a formation evaluation tool, such as formation evaluation tool 600 of FIG. 6.

The time scale indicates a total time in seconds for this sequence of about 1 hour, including inflating and deflating isolation packers. Total potential fluid pumped during the "pump out from formation" time interval was 57 liters. Pump efficiencies less than 100% likely resulted in less formation fluid processed than the theoretical amount. The linear nature of the cumulative pump out volume indicated a nearly constant pump out rate illustrated in FIG. 9. A short pause in the pump out may have caused the pressure anomaly near the mid-point of the pump out sequence.

Figure 10:
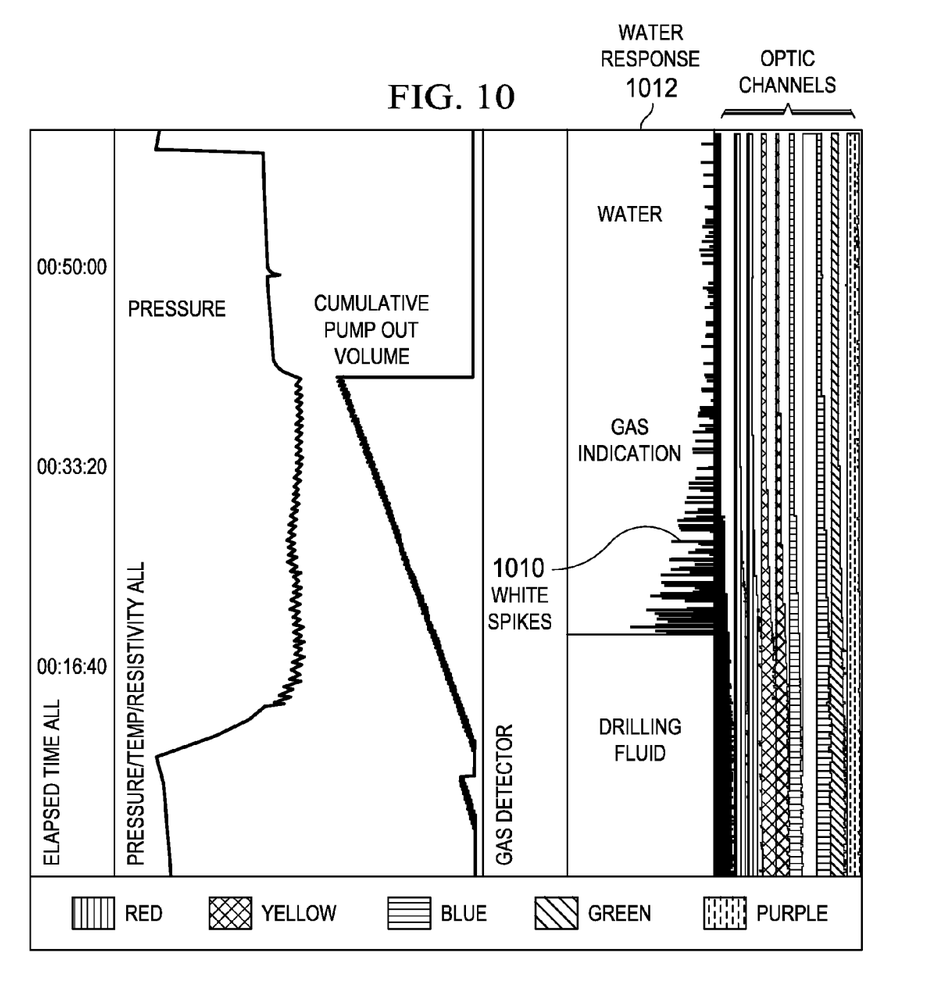
FIG. 10 is an optical analyzer response indicating water and gas production during a pump out sequence, according to an illustrative embodiment of the present invention.

Referring now to FIG. 10, an optical analyzer response indicating water and gas production during a pump out sequence is shown according to an illustrative embodiment of the invention. The results shown in FIG. 10 can be obtained by using an optical fluid analyzer, such as optical fluid analyzer 720 of FIG. 7.

Optical response from the optical fluid analyzer is only valid while fluid is moving past the detectors. Therefore, only the optical response during pump out should be considered for fluid analysis. The gas detector of the optical fluid analyzer does not respond directly to the presence of gas. However, low levels of gas can be detected by a spectrometer, such as liquid detector 710 of FIG. 7, as indicated by white spikes 1010 in the largely blue water response 1012.

The indication of gas at a given pump out pressure is an indication of the water bubble point pressure. Assuming the formation water and coal gas are in equilibrium—which is the case for undisturbed drill sites, the formation of gas at a given pump out pressure is an indication that the current pump out pressure is equal to the critical desorption pressure.

Figure 11:
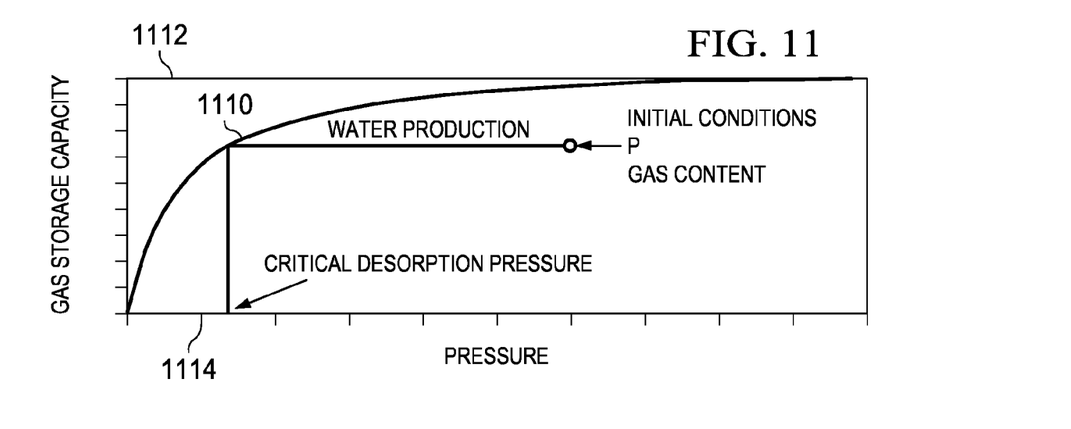
FIG. 11 is a plot of a Langmuir sorption isotherm showing the critical desorption pressure from the onset of gas production, according to an illustrative embodiment of the present invention.

Referring now to FIG. 11, a plot of a Langmuir sorption isotherm showing the critical desorption pressure from the onset of gas production is shown according to an illustrative embodiment of the invention. The Langmuir equation is commonly applied to CBM to predict gas content.

The Langmuir equation can generally be expressed as:

$$G_s = (1 - f_a - f_m)\frac{VLP}{PL+P}$$

wherein:
(VL)=Langmuir volume constant;
(PL)=Langmuir pressure content;
($f_a$)=Ash content fraction;
($f_m$)=Moisture content fraction;
(P)=pump out pressure; and
($G_s$)=Gas storage capacity The Langmuir volume constant (VL) is the maximum gas storage capacity reached on the sorption isotherm, illustrated as an eventual flattening of the curve 1110 at point 1112. The Langmuir pressure content (PL) is the pressure at which gas storage capacity is half the maximum storage capacity (VL), illustrated at point 1114. Both VL and PL can be determined by laboratory testing of coal cores retrieved from the interval of interest. Ash content fraction (fa) can be determined from open hole log responses and/or laboratory testing. Moisture content fraction (fm) can be determined from laboratory testing of cores but not reliably from open hole logs.

The present invention therefore provides systems, methods and apparatuses for well site analysis using wire line formation evaluation tools for in situ determination of critical desorption pressures. The critical desorption pressure is determined by pumping out an area within a well bore. As the pressure in that area is decreased, formation fluid from the surrounding formation matrix is drawn into the area. As the local pressure is decreased further, gaseous bubbles within the formation fluid will begin to form. The formation fluid is observed, and the formation of the gaseous bubbles is detected. The critical desorption pressure is determined based upon the presence of gas within the formation fluid. The concentration of gas within the formation fluid can then be derived from the critical desorption pressure. Based on the concentration of gas and the estimated total gas content within the formation, decisions can be made regarding the economic feasibility of gas production from the well.

Although the foregoing is provided for purposes of illustrating, explaining and describing certain embodiments of the invention in particular detail, modifications and adaptations to the described methods, systems and other embodiments will be apparent to those skilled in the art and may be made without departing from the scope or spirit of the invention.

What is claimed is:

1. A method for determining a critical desorption pressure comprising:
pumping drilling fluid out of an area within a well bore;
drawing formation fluid from a formation into the area;
detecting a bubble point pressure of the area by, for a plurality of iterations until the bubble point pressure is detected:
obtaining the formation fluid in a flowline,
measuring, by a liquid detector connected to the flowline, a response time of light passing through the formation fluid in the flowline,
detecting the bubble point pressure as a current local pressure in the area when, based on the response time, gas is determined to be present in the flowline, and
reducing, by a pressure interval, the current local pressure in the area when, based on the response time, gas is determined not to be present in the flowline, wherein reducing the current local pressure comprises pumping additional drilling fluid out of the area to draw the formation fluid from the formation into the area,
wherein, for each iteration of the plurality of iterations, the flowline is located at a requisite depth; and
identifying the critical desorption pressure of the formation fluid as equal to the bubble point pressure.

2. The method of claim 1, further comprising:
predicting, after determining the critical desorption pressure, a gas content in a formation using the following equation:

$$G_s = (1 - f_a - f_m)\frac{VLP}{PL+P},$$

wherein:
VL is a Langmuir volume constant,
PL is a Langmuir pressure content,
$f_a$ is an ash content fraction,
$f_m$ is moisture content fraction,
P is a pump out pressure, and
$G_s$ is a gas storage capacity.

3. The method of claim 1, wherein the area is defined by the inflation of at least two formation packers.

4. The method of claim 1, wherein pumping the drilling fluid out of the area causes the current local pressure of the area to be less than a formation pressure of the formation.

5. The method of claim 1, wherein the liquid detector comprises an optical spectrometer.

6. The method of claim 1, wherein the formation fluid is drawn from a coal bed methane formation.

7. The method of claim 1,
wherein pumping the drilling fluid out of the area within the well bore lowers the current local pressure of the area, and
wherein the presence of gas occurs when the current local pressure reaches the water bubble point pressure.

8. The method of claim 7, the method further comprising determining a concentration of gas within the formation fluid based on the critical desorption pressure.

9. An apparatus for determining a critical desorption pressure comprising:
a pump for:
pumping drilling fluid out of an area within a well bore; and
pumping formation fluid out of the area, wherein the formation fluid is drawn into the area from a formation after pumping the drilling fluid out of the area;
a flowline for obtaining the formation fluid;
a liquid detector connected to the flowline for measuring a response time of light passing through the formation fluid in the flowline; and
a data processing system having a memory containing a set of instructions and a processor, wherein responsive to execution of the set of instructions, the processor:
detects a bubble point pressure of the area by, for a plurality of iterations until the bubble point pressure is detected:

detecting the bubble point pressure as a current local pressure in the area when, based on the response time, gas is determined to be present in the flowline, and initiate reducing, by a pressure interval, the current local pressure in the area when, based on the response time, gas is determined not to be present in the flowline, wherein reducing the current local pressure comprises pumping additional drilling fluid out of the area to draw the formation fluid from the formation into the area, and wherein reducing the current local pressure causes the formation fluid to flow in the flowline for analysis by the liquid detector, wherein, for each iteration of the plurality of iterations, the flowline is located at a requisite depth; and identifies the critical desorption pressure of the formation fluid as equal to the bubble point pressure.

10. The apparatus of claim 9, wherein the pump, the fluid sample chamber, and the optical fluid analyzer are included in a formation evaluation tool, the formation evaluation tool further comprising at least two formation isolation packers defining the area.

11. The apparatus of claim 9, wherein the liquid detector comprises an optical spectrometer.

12. A non-transitory computer readable medium comprising computer readable program code embodied therein for performing a method for determining a critical desorption pressure, the method comprising:

pumping drilling fluid out of an area within a well bore;
drawing formation fluid from a formation into the area;
detecting a bubble point pressure of the area by, for a plurality of iterations until the bubble point pressure is detected:
  obtaining the formation fluid in a flowline,
  measuring, by a liquid detector connected to the flowline, a response time of light passing through the formation fluid in the flowline,
  detecting the bubble point pressure as a current local pressure in the area when, based on the response time, gas is determined to be present in the flowline, and
  reducing, by a pressure interval, the current local pressure in the area when, based on the response time, gas is determined not to be present in the flowline, wherein reducing the current local pressure comprises pumping additional drilling fluid out of the area to draw the formation fluid from the formation into the area, wherein, for each iteration of the plurality of iterations, the flowline is located at a requisite depth; and identifying the critical desorption pressure of the formation fluid in the area as equal to the bubble point pressure.

13. The non-transitory computer readable medium of claim 12, wherein the area is defined by the inflation of at least two formation packers.

14. The non-transitory computer readable medium of claim 12, wherein pumping the drilling fluid out of the area causes the current local pressure of the area to be less than a formation pressure of the formation.

15. The non-transitory computer readable medium of claim 12, wherein the liquid detector comprises an optical spectrometer.

16. The non-transitory computer readable medium of claim 12, wherein pumping the formation fluid out of the area within the well bore lowers the current local pressure of the area, and wherein the presence of gas occurs when the current local pressure reaches the water bubble point pressure.

17. The non-transitory computer readable medium of claim 12, the method further comprising determining a concentration of gas within the formation fluid based on the critical desorption pressure.

18. The non-transitory computer readable medium of claim 12, wherein the formation fluid is drawn from a coal bed methane formation.

* * * * *